United States Patent
Nazarian et al.

(10) Patent No.: US 12,129,537 B2
(45) Date of Patent: *Oct. 29, 2024

(54) DIGITALLY CONTROLLED VARIABLE STIFFNESS SPORTING EQUIPMENT

(71) Applicant: Verispellis Skis & Snowboards, Inc., Wellesley, MA (US)

(72) Inventors: Ara Nazarian, Wellesley, MA (US); Edward K. Rodriguez, Medfield, MA (US)

(73) Assignee: VERISPELLIS SKIS & SNOWBOARDS, INC., Wellesley, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/374,150

(22) Filed: Jul. 13, 2021

(65) Prior Publication Data
US 2022/0002852 A1      Jan. 6, 2022

Related U.S. Application Data

(63) Continuation of application No. 16/666,909, filed on Oct. 29, 2019, now Pat. No. 11,078,562, which is a
(Continued)

(51) Int. Cl.
*C22F 1/00* (2006.01)
*A01K 87/00* (2006.01)
(Continued)

(52) U.S. Cl.
CPC ............ *C22F 1/006* (2013.01); *A01K 87/007* (2013.01); *C22F 1/002* (2013.01); *C22F 1/10* (2013.01);
(Continued)

(58) Field of Classification Search
CPC ... F03G 7/06; F03G 7/065; A63C 5/03; A63C 5/07; A63C 13/00; A63C 2203/12;
(Continued)

(56) References Cited

U.S. PATENT DOCUMENTS 4,864,860 A      9/1989   Manseth
10,119,526 B1 *  11/2018  Peeters .................. A61B 5/022
(Continued)

FOREIGN PATENT DOCUMENTS

JP        08037998 A   *   2/1996

OTHER PUBLICATIONS

U.S. Appl. No. 15/409,745, now 10,493,354 filed Jan. 19, 2017, Digitally Controlled Variable Stiffness Ski, Snowboard, and Boots System.
(Continued)

*Primary Examiner* — Shafiq Mian
(74) *Attorney, Agent, or Firm* — SCHWEGMAN LUNDBERG & WOESSNER, P.A.

(57) ABSTRACT

A system, method, and apparatus for an athlete to variably control the flexibility and stiffness parameters of a piece of athletic equipment to select a desired performance characteristic of the equipment based on the stiffness parameter. According to certain embodiments discussed herein, an item of sporting equipment may be embedded, impregnated, lined, or encased using nitinol components, wherein the nitinol components may themselves be treated using a specific method in order to achieve the desired transformation results, as described below.

16 Claims, 6 Drawing Sheets

Related U.S. Application Data continuation-in-part of application No. 15/409,745, filed on Jan. 19, 2017, now Pat. No. 10,493,354.

(60) Provisional application No. 62/280,209, filed on Jan. 19, 2016.

(51) Int. Cl.
| | | |
|---|---|---|
| *C22F 1/10* | (2006.01) | |
| *F03G 7/06* | (2006.01) | |
| *A63C 5/03* | (2006.01) | |
| *A63C 5/07* | (2006.01) | |
| *A63C 13/00* | (2006.01) | |
| *F41B 5/00* | (2006.01) | |
| *F41B 5/12* | (2006.01) | |
| *F41B 5/14* | (2006.01) | |

(52) U.S. Cl.
CPC ............ *F03G 7/06* (2013.01); *F03G 7/0614* (2021.08); *F03G 7/0615* (2021.08); *F03G 7/065* (2013.01); *A63C 5/03* (2013.01); *A63C 5/07* (2013.01); *A63C 13/00* (2013.01); *A63C 2203/12* (2013.01); *F41B 5/001* (2013.01); *F41B 5/0015* (2013.01); *F41B 5/0021* (2013.01); *F41B 5/0036* (2013.01); *F41B 5/0042* (2013.01); *F41B 5/0047* (2013.01); *F41B 5/0057* (2013.01); *F41B 5/0078* (2013.01); *F41B 5/12* (2013.01); *F41B 5/1426* (2013.01)

(58) Field of Classification Search
CPC .. C22F 1/006; C22F 1/002; C22F 1/10; F41B 5/001; F41B 5/0021; F41B 5/0036; F41B 5/0015; F41B 5/0042; F41B 5/0047; F41B 5/00–0089; F41B 5/1426
USPC ............ 60/527–529; 310/306, 307; 280/602; 43/18.1 R, 18.5; 124/23.1, 25, 25.6, 38
See application file for complete search history.

(56) References Cited

U.S. PATENT DOCUMENTS

| | | | |
|---|---|---|---|
| 10,493,354 | B2 | 12/2019 | Nazarian et al. |
| 10,603,571 | B2 | 3/2020 | Nazarian et al. |
| 11,078,562 | B2 | 8/2021 | Nazarian et al. |
| 2003/0155740 | A1 | 8/2003 | Lammer |
| 2007/0058070 | A1* | 3/2007 | Chen ............ F03G 7/065 348/340 |
| 2009/0218321 | A1* | 9/2009 | Ashman ............ A61B 17/10 219/50 |
| 2012/0099004 | A1* | 4/2012 | Shibuno ............ H04N 23/69 348/E5.051 |
| 2012/0276309 | A1* | 11/2012 | Failing ............ A63C 5/03 428/34.1 |
| 2013/0309089 | A1 | 11/2013 | Madsen et al. |
| 2013/0341127 | A1 | 12/2013 | Mann |
| 2014/0138367 | A1* | 5/2014 | Zhang ............ B23K 35/30 219/137 WM |
| 2016/0147262 | A1 | 5/2016 | Lee |
| 2017/0203192 | A1 | 7/2017 | Nazarian et al. |
| 2018/0147476 | A1 | 5/2018 | Nazarian et al. |
| 2020/0063251 | A1 | 2/2020 | Nazarian et al. |

OTHER PUBLICATIONS

U.S. Appl. No. 15/804,938, now 10,603,571 filed Nov. 6, 2017, Digitally Controlled Variable Stiffness Ski, Snowboard, and Boots System.

U.S. Appl. No. 16/666,909, now 11,078,562 filed Oct. 29, 2019, Digitally Controlled Variable Stiffness Sporting Equipment.

"U.S. Appl. No. 15/409,745, Advisory Action mailed Jul. 1, 2019", 5 pgs.

"U.S. Appl. No. 15/409,745, Examiner Interview Summary mailed Apr. 11, 2019", 4 pgs.

"U.S. Appl. No. 15/409,745, Final Office Action mailed Apr. 18, 2019", 13 pgs.

"U.S. Appl. No. 15/409,745, Non Final Office Action mailed Oct. 5, 2018", 14 pgs.

"U.S. Appl. No. 15/409,745, Notice of Allowance mailed Jul. 29, 2019", 8 pgs.

"U.S. Appl. No. 15/409,745, Preliminary Amendment filed Sep. 11, 2017", 6 pgs.

"U.S. Appl. No. 15/409,745, Response filed Jun. 18, 2019 to Final Office Action mailed Apr. 18, 2019", 12 pgs.

"U.S. Appl. No. 15/409,745, Response filed Dec. 26, 2018 to Non Final Office Action mailed Oct. 5, 2018", 12 pgs.

"U.S. Appl. No. 15/409,745, Response filed Jul. 18, 2019 to Advisory Action mailed Jul. 1, 2019", 12 pgs.

"U.S. Appl. No. 15/804,938, Final Office Action mailed Aug. 22, 2019", 16 pgs.

"U.S. Appl. No. 15/804,938, Non Final Office Action mailed Jan. 11, 2019", 13 pgs.

"U.S. Appl. No. 15/804,938, Notice of Allowance mailed Nov. 21, 2019", 8 pgs.

"U.S. Appl. No. 15/804,938, Response filed Oct. 21, 2019 to Final Office Action mailed Aug. 22, 2019", 13 pgs.

"U.S. Appl. No. 15/804,938, Response filed May 13, 2019 to Non Final Office Action mailed Jan. 11, 2019", 12 pgs.

"U.S. Appl. No. 16/666,909, Final Office Action mailed Feb. 25, 2021", 18 pgs.

"U.S. Appl. No. 16/666,909, Non Final Office Action mailed Aug. 7, 2020", 19 pgs.

"U.S. Appl. No. 16/666,909, Notice of Allowance mailed Apr. 5, 2021", 10 pgs.

"U.S. Appl. No. 16/666,909, Response filed Mar. 24, 2021 to Final Office Action mailed Feb. 25, 2021", 7 pgs.

"U.S. Appl. No. 16/666,909, Response filed Nov. 9, 2020 to Non Final Office Action mailed Aug. 7, 2020", 9 pgs.

* cited by examiner

DIGITALLY CONTROLLED VARIABLE STIFFNESS SPORTING EQUIPMENT

CLAIM OF PRIORITY

This application is a continuation application of and claims priority benefit from U.S. patent application Ser. No. 16/666,909 filed on Oct. 29, 2019, which is a continuation-in-part application of and claims priority benefit from U.S. patent application Ser. No. 15/409,745 filed on Jan. 19, 2017 and entitled "Digitally Controlled Variable Stiffness Ski, Snowboard, and Boots System", which claims the benefit of priority to U.S. Patent Application No. 62/280,209, filed Jan. 19, 2016, all of which are incorporated by reference herein in their entireties.

TECHNICAL FIELD

The present application relates generally to sporting equipment, and more specifically but not limited to, fishing rods, archery equipment, skis, and snowboards.

BACKGROUND

The present invention relates to sporting equipment performance-based flexibility parameters, and more particularly to modifying the flexibility and stiffness parameters in a piece of sporting equipment.

Sporting equipment is typically purchased based on the specific skill levels and needs of the user. For example, existing skis and snowboards are designed for specific skiing conditions (groomer, powder, off-piste, and the like) that provide better control for each skiing/snowboarding environment. This is accomplished by changes in the physical shape of the skis, the manufacturing materials and binding/boot configurations among other factors. Once manufactured, except for minor adjustments, such as waxing or binding adjustments, the performance characteristics of existing skis or snowboard are mostly fixed. As a result, none of the existing categories allow a skier/snowboarder to modify the stiffness of the ski/snowboard to adapt to changing snow conditions during the day. Similarly, off-the-shelf bows and fishing rods traditionally have set stiffness/flexibility properties which cannot change. According to present systems and methods, multiple different pieces of sporting equipment are needed based on a multitude of factors that include an athlete's strength, skill level, or conditions of use.

BRIEF DESCRIPTION OF THE DRAWINGS

Some embodiments are illustrated by way of example and not limitation in the figures of the accompanying drawings in which.

DETAILED DESCRIPTION

Example methods and systems for digitally controlled, variable rate (i.e., flexibility) sporting equipment are described. In the following description, for purposes of explanation, numerous specific details are set forth in order to provide a thorough understanding of example embodiments. It will be evident, however, to one skilled in the art that the present invention may be practiced without these specific details. The description is not to be taken in a limiting sense but is made merely for the purpose of illustrating the general principles of the invention, since the scope of the invention is best defined by the appended claims.

Broadly, embodiments of the present invention provide a system, method, and apparatus for an athlete to variably control a rate of a stiffness parameters of a piece of athletic equipment to select a desired performance characteristic of the equipment based on the stiffness parameter. According to certain embodiments discussed herein, an item of sporting equipment may be embedded, impregnated, lined, or encased using nitinol components, wherein the nitinol components may themselves be treated using a specific method in order to achieve the desired transformation results, as described below. The method may for example include employing a thermally reactive material, such as nitinol, wherein the nitinol has been treated by a treatment process that comprises a treatment temperature and a treatment duration. Accordingly, different nitinol properties may be achieved by applying different treatment processes.

By way of example, the system provides an athlete the ability to have a single piece of sporting equipment with variable properties that may be controlled by the athlete through a client device or based on inputs provided by the athlete directly to the item of sporting equipment. For example, with a set of skis, snowboard, or boots, a skier/snowboarder may adjust the stiffness of his or her skis, snowboard, and/or boots based on the skiing or snowboarding conditions, throughout the day, without the need to change their skis/snowboard. This will enable the skier or the snowboarder to have better control and potentially reduce risk of injury.

In the context of archery or fishing, a bow or fishing-rod may be constructed of, or enhanced with the use of specially treated nitinol components, such as nitinol rods, or plates, such that a user may activate a variable stiffness system to cause the nitinol components to change from a first phase to a second phase, wherein the second phase has different stiffness properties than the first phase. By doing so, the nitinol components may provide the user with additional mechanical assistance.

Figure 1:
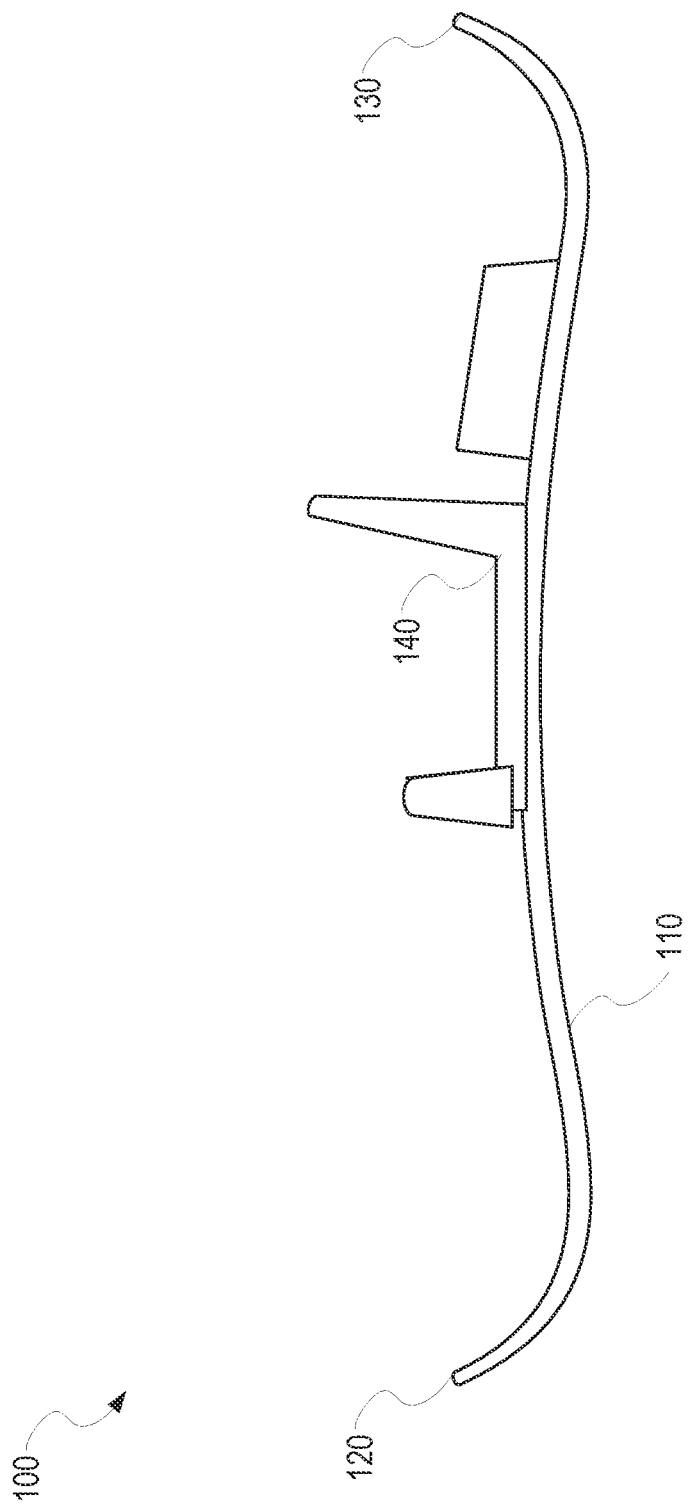
FIG. 1 is a side elevation view of an embodiment of a digitally controlled variable stiffness item, according to certain example embodiments.
Figure 2:
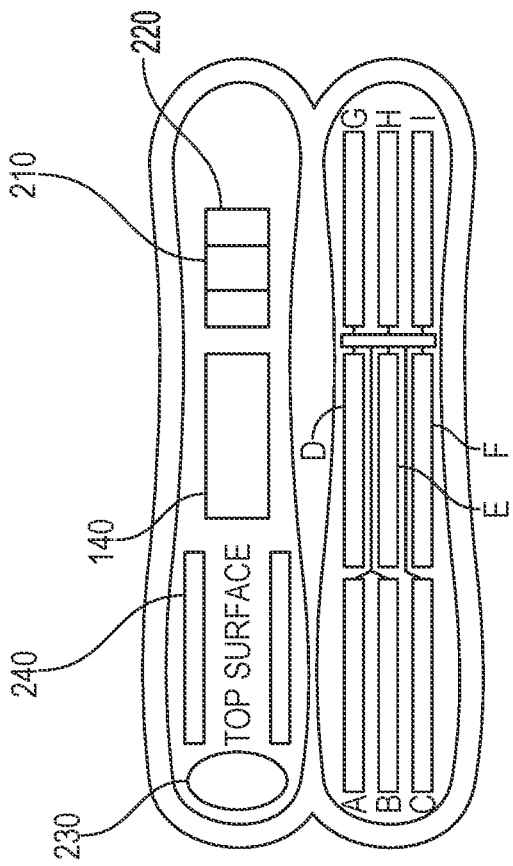
FIG. 2 is a planar view of a digitally controlled variable stiffness item, according to certain example embodiments.

For purposes of non-limiting illustration, the drawings of FIGS. 1 and 2 generally depict the body of digitally controlled variable flexibility sporting equipment, that may include a ski or snowboard, and the aspects disclosed are equally applicable to each. For ease of description, an embodiment of a ski will be described, it being understood that the technology disclosed herein finds applicability to a pair of skis, a snowboard, boots, and bindings, and other articles of athletic equipment.

As will be appreciated from the side elevational view of FIG. 1, a ski 100 comprises an elongate body 110, having a front end 120 and a back end 130. The ends 120 and 130 may be formed with an upturned tip or tail, respectively. The elongate body 110 has a substantially flat surface along its longitudinal length, with a slightly arched upward curvature intermediate the ends. A binding 140 may be mounted proximate to a midpoint of the ski 100. The binding 140 serves to releasably attach a boot to the ski 100.

Referring now to the top surface view shown in diagram 200 of FIG. 2, a battery pack 210 and control unit 220 may be mounted to an aft or fore portion of the ski or snowboard 100, or be attached to the back of the boots, to provide a power source and control unit for operation of the system components and circuitry that may include a heating control module and a connectivity module. The control unit 220 may comprise a connectivity module and a nitinol heating control module, wherein the ski body 110 may comprise a heating element means embedded within or on a surface of the ski body 110. An upper surface of the ski or snowboard 100 may include a solar panel 230, preferably located near the tip of the ski or snowboard 100 (e.g., the front end 120), which may use solar radiation to produce an electric charge for the control unit 220 or other functional elements including the battery pack 210. The ski or snowboard 100 may also be provided with at least one strip of a piezoelectric material 240, whereby the flexing of the ski 100 (and thereby the piezoelectric material 240), in use, will produce an electric charge.

The control unit 220 may include a battery-charging module that receives and regulates the electric charges to recharge the battery back and extend the battery life of the system. The battery pack 210 may be any suitable battery source, and is preferably a lithium ion battery. The battery housing embodiment may use part of the power to heat the housing via a wire or tape heater to maintain current flow through the batteries in cold temperature. This will prevent the occurrence of a "dead" battery in a cold environment. In some example embodiments, the battery pack 210 may be integrated into a riser plate to be mounted beneath the bindings 140. Riser plates are plates that may be inserted between the binding 140 and the ski 100, so adjust a height or position of the binding 140 relative to the ski 100. In further embodiments, the battery pack 210 may be configured to be removably attached to a ski boot inserted into the binding 140, such as by a clipping or other fastening means, similar to a ski-boot heater system. Other embodiments will consist of the battery pack 210 to be removably attached to the skis or snowboard, such as by a clipping or other fastening means.

The diagram 200 of FIG. 2 also depicts a plurality of components formed of a thermally responsive material (e.g., components A, B, C, D, E, F, G, H, and I) disposed within or along the body of an item of sporting equipment (e.g., ski or snowboard body 110), which may be arranged according to zones or regions. While the diagram 200 provides an illustration of a ski, the item of sporting equipment may also include, but are not limited to, a snowboard, a bow, and a fishing-rod. In some embodiments, the components are formed using a shape memory alloy, such as an alloy of nickel and titanium (or, "nitinol"), which are integrally formed within the ski or snowboard body 110. The components may be disposed internally to the item of sporting equipment, such as in plates, sheets, or rods, or in some embodiments may be applied to an external surface of the item of sporting equipment.

According to certain example embodiments, the components may be formed of nitinol which has been treated using a treatment process that comprises one or more treatment temperatures and treatment durations, wherein the treatment process imparts corresponding properties to the treated component. For example, in some embodiments, the nitinol components may be treated at a treatment temperature of 805° Celsius (C), and a treatment duration of 5 minutes. In further embodiments, the nitinol components may be treated at a treatment temperature of 550° C., and a treatment duration of 5 minutes. In further embodiments, the nitinol components may be treated at a treatment temperature of 400° C. and a treatment time of 5 minutes. In further embodiments, the nitinol components may be treated at a treatment temperature of 805° C., and a treatment duration of 30 minutes.

In some embodiments, the treatment processes described above may also include one or more quench cycles, wherein the nitinol components are rapidly cooled in water, oil, or air. In some embodiments, the treatment process may comprise a combination of multiple treatment process cycles. For example, as an illustrative example, the treatment process for a particular nitinol component may comprise an initial treatment temperature of 805° C. for a treatment duration of 30 minutes, followed by a first quench, followed by a subsequent treatment temperature of 550° C. at a treatment duration of 5 minutes and a second quench.

In some embodiments, the specific treatment process may be determined based on the application of the nitinol component, wherein the application includes a location of the nitinol component within the item of sporting equipment. For example, in reference to FIG. 2, components A, B, and C may be treated using a first treatment process, while components D, E, and F are treated by a second treatment process, and components G, H, and I are treated by yet a third treatment process. In further embodiments, each component may be treated by a distinct treatment process altogether.

By way of non-limiting example, and as depicted in FIG. 2, the components may include a medial front edge core, a central front edge core, a lateral front edge core, a medial core edge, a central core edge, a lateral core edge, a medial back edge core, a central back edge core, and a lateral back edge core, according to certain example embodiments. Further embodiments may comprise any arrangements and number of components, including for example, 2 front and back or 3 front, middle, back core elements used in the design. The arrangement and configuration of the components within the item of sporting equipment may be influenced by the structural properties of the other components forming the item of sporting equipment (e.g., ski body 110 of FIG. 1). For example, the components may be embedded into the item of sporting equipment (e.g., ski body 110) in two or more layers, such as at the top and bottom of the ski 100 for increased stiffness and variability of the stiffness.

Thus, when the components (e.g., components A, B, C, D, E, F, G, H, I) are heated by the heating element, the properties of the components may change from a softer, hyper elastic, martensitic phase to a more rigid austenitic phase. This change in phase of the components will thus modify the stiffness profile of the item of sporting equipment (e.g., ski or snowboard 100) at various parts of such equipment, so that the item of sporting equipment may be tuned to respond to changes in terrain, conditions, expected performance, or to provide additional mechanical assistance to the user of the item of sporting equipment.

In some example embodiments, the control unit 220 may cause one or more of the components to induce a phase shift, enabling the control unit 220 to control a flexibility property of an item of sporting equipment (e.g., ski 100) with a greater level of precision and resolution. In further embodiments, the control unit 220 may further be configured to cause a portion of the components at specific locations along the item of sporting equipment to induce phase shifts of varying degrees. For example, the control unit 220 may cause components A, B, and C to induce a phase shift of a first degree, and components D, E, and F to induce a phase shift of a second degree.

In further embodiments, a property of an input may define a phase change to be applied to one or more of the components. As an illustrative example, the control unit 220 may be coupled with an input module, such as a switch mechanism or other sensor device (i.e., a trigger, a push-button, multi-position switch, optical sensor, etc.), through which a user may provide an input. A duration of the input, for example a period of time in which the switch mechanism is closed, may thereby correlate with varying phase changes. For example, a first input duration may cause the system to induce a phase change upon a first portion of the components, while a second input duration may cause the system to induce a phase change upon a second portion of the components, wherein the second portion of the components may include the first portion. In some embodiments, the input duration may correlate with a temperature of the heating element.

In some embodiments, the control unit 220 may be coupled with a digital or mechanical multi-position switch, such as a rotary switch, wherein an input property of inputs received at the multi-position switch may include a switch position registered by the multi-position switch. For example, in the context of an item of sporting equipment that includes a bow or fishing-rod, as the bow is drawn, or the fishing rod is flexed, the multi-position switch may register a switch position based on how far the bow is drawn, or how far the fishing-rod is flexed. In such embodiments, the greater the bow is drawn or fishing-rod is flexed, the system may respond by increasing or decreasing a stiffness parameter of the item of sporting equipment based on the corresponding switch position.

In an embodiment such as a cross bow with a nitinol core, the nitinol can be in a martensitic state when cocked and then heated by the heating element to change phase into a austenitic state thus imparting increased energy into the cocked crossbow allowing for more energy release and a faster and longer arrow trajectory.

Figure 3:
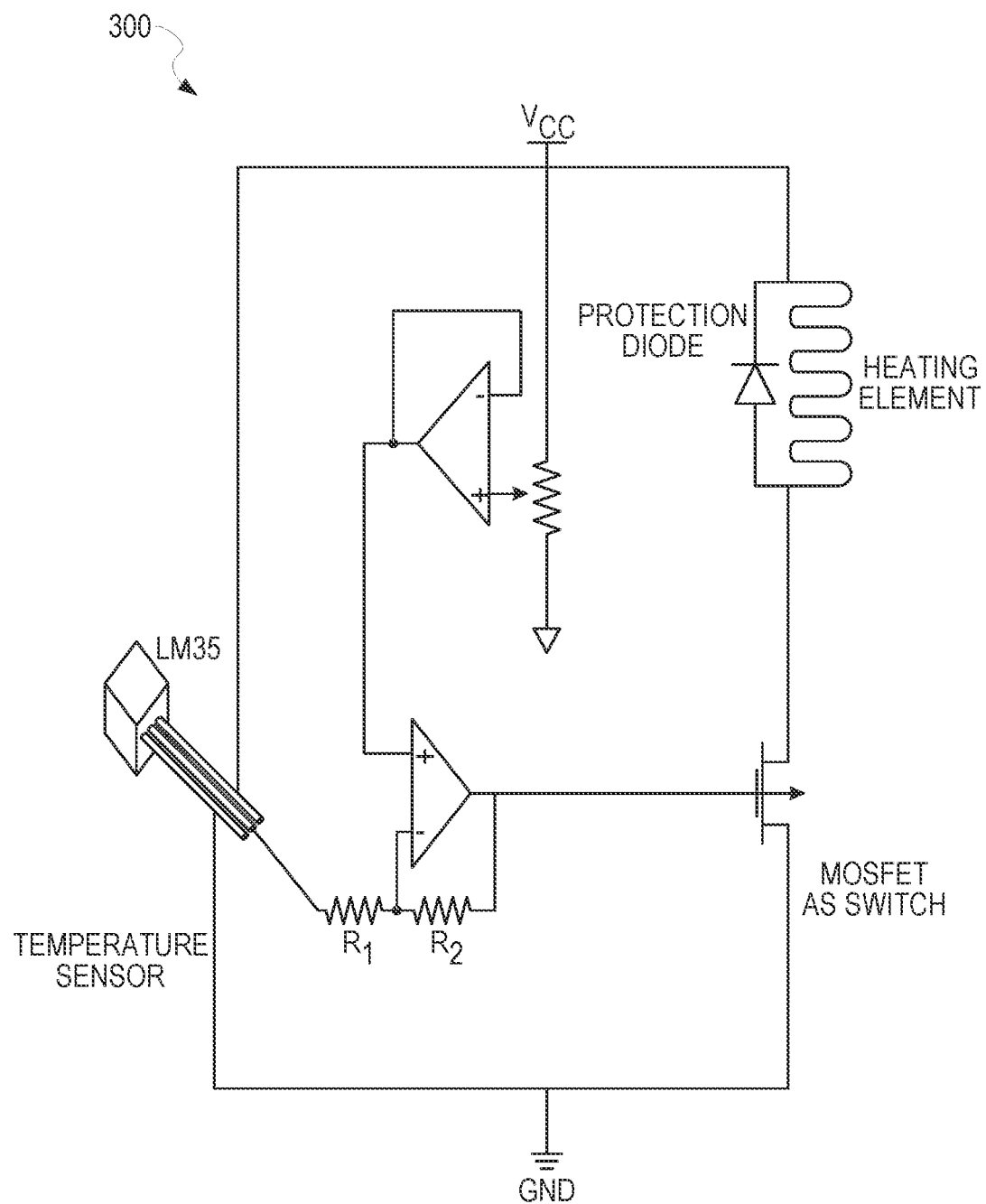
FIG. 3 is an electric circuit schematic of a control unit of a heating system, according to certain example embodiments.

FIG. 3 is an electric circuit schematic 300 of the control unit 220, according to certain example embodiments. The description is not to be taken in a limiting sense, as it describes one of the methods to control the system. The first stage of the circuit is a temperature sensor (LM35) used to constantly monitor the temperature of the item of sporting equipment (e.g., ski or snowboard body 110). The output of the sensor is electric voltage linearly dependent on the ski board temperature. The second stage of the circuit is for comparison of the measured voltage (measured temperature) from the sensor with the adjustable reference voltage. The reference voltage may be precisely adjusted to desired level using the resistor Vr. The difference between the measured voltage and the reference voltage will set the voltage at the gate of MOSFET to high which results in current flow through the heating element and eventually heating up the ski board. At the same time the temperature sensor will monitor the temperature increase in the board and increasing the sensor output voltage accordingly. The MOSFET will stay on as long as there is voltage difference and once the voltage level from the sensor reaches the reference voltage, the MOSFET will be turned off which stops current flow through the element. The power supply for the circuit is 12 v, which can heat up the board for 2-3 hours. In some embodiments, the heating element means comprises a Nichrome wire, which has well defined resistance and thermal property.

The heating element means functions to increase the temperature of the item of sporting equipment, and according to certain example embodiments, may comprise a Nichrome wire or another option. Nichrome wire heating elements have well defined resistance and derived current at different temperatures based on the measurement done in different conditions.

There are different wires based on the wire Gauge value that can be selected for various application. Using a typical rechargeable battery (http://www.dhgate.com/product/the-large-capacity-rechargeable-lithium-battery/204392339.html), which is 12 v and 7500 mAh, the battery life time (in hour) can be calculated according to this formula:

$$\text{Battery Life} = \frac{\text{Battery Capacity in } \textit{Miliamps} \text{ per hour}}{\text{Load Current in } \textit{miliamps}} \times 0.70$$

In some embodiment, a temperature gradient of approximately 10° C. may be desired. In some embodiments, the wire may include 24-inch Nichrome wires with Gauge size of 26, in order to increase the temperature from 32° F. to 42° F., we have to derive 0.36 A current with 12 v source. In some embodiments, rather than wires, heat may be generated based on Polyamide (Kapton) and rubber heaters.

In some example embodiments, as discussed above, the battery pack (e.g., battery pack 210 of FIG. 2) may be removable and may be incorporated into the binding section for the skis (e.g., such as beneath the bindings 140 of FIG. 1), attached to the back of the boots (e.g., by a clip or similar fastening means), or just aft of the binding section (e.g., on the surface of the ski or snowboard body 110 itself). For example, the battery pack 210 may be chargeable via a USB cable connectable to any USB power source or by any other DC V source, such as the 12 V DC source of a motor vehicle. As indicated, the battery's life may be extended during skiing/riding by the optional solar arrays or piezoelectric charge elements.

The stiffness parameter control of the individual components is modulated and regulated by activating a heating element, such as coil or mesh that is built into the ski. The heating element is positioned adjacent to the thermally responsive components (e.g., Nitinol layer) to induce a phase change upon the components by applying varying amounts of heat to portions of the plurality of thermally responsive components. The heating elements are operatively connected to the heating control module of the control unit 220 so as to maintain the desired temperature corresponding to the desired selected stiffness of the ski, by region or zone. The heating control module circuitry may also include temperature sensors embedded in the item of sporting equipment to provide feedback to the heating control module for regulating the desired temperature of one or more of the components. The shape memory components will have a heating element adjacent to them that can provide a rapid temperature rise adjustment of the element and therefore increase the stiffness property of the item of sporting equipment.

In some embodiments, a ski boot may also be constructed with a distribution of core elements, such as in the form of a mesh lining (e.g., a Nitinol mesh lining) and a heating mesh between an external shell and an inner foam lining of the boot, and may connect to the battery pack 210 and heating control components of the control unit 220 adjacent to the bindings 140 (with a non-restrictive connection that will not affect ski release mechanisms based on the DIN settings). Heating of the boot heating mesh element may also be activated by the remote controller system or the app, resulting in a phase change of the mesh lining.

Figure 4:
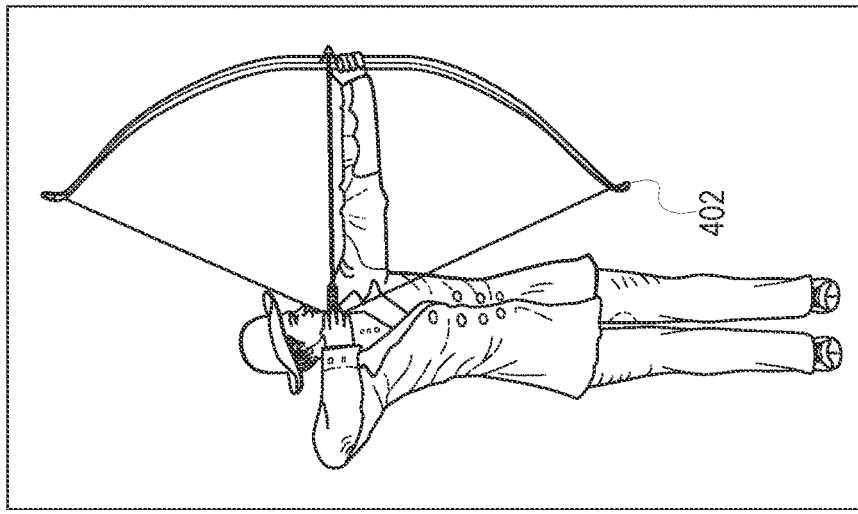
FIG. 4 is a diagram depicting an item of sporting equipment that includes a variable stiffness system, according to certain example embodiments.
Figure 4:
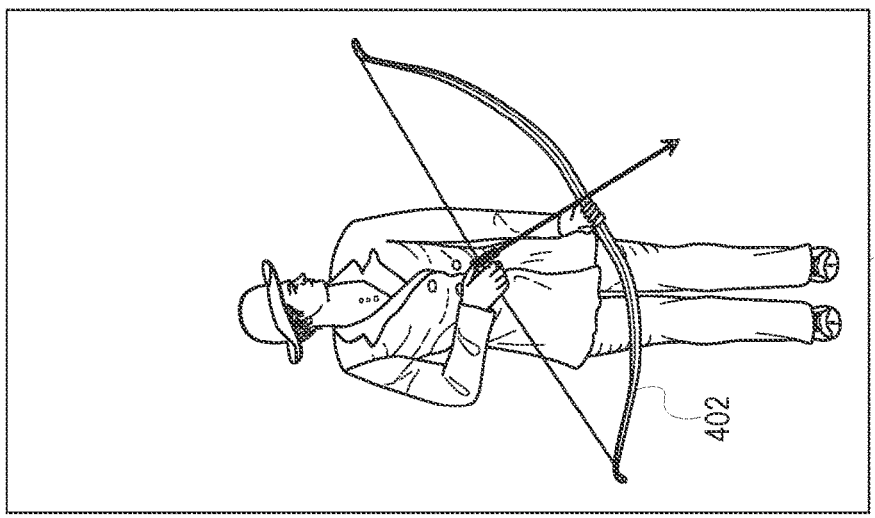

FIG. 4 is a diagram 400 depicting an item of sporting equipment that includes a variable stiffness system, according to certain example embodiments. As seen in FIG. 4, the item of sporting equipment may include a bow 402.

As seen in the diagram 400, a user of the bow 402 may start with the bow 402 in a first state 404, wherein the first state is a resting position wherein the user has not drawn the bow. As the user draws the bow 402, causing the bow 402 to go from the first state 404 to a second state 406, the flexing of the bow 402 may provide an input through an input module of the variable stiffness system located on, or proximate to, the blow 402. For example, the input module may include a multi-position switch, optical sensor, or a simple open and closed switch mechanism. In some embodiments, a variable stiffness system, as described above, may detect a position of the bow, and in response to detecting the position of the bow, and based on a value of the input received by the input module, cause a control module of the variable stiffness system to initiate a heating element proximate to at least a portion of a plurality of thermally responsive components embedded within or upon the bow 402, causing a flexibility and stiffness property of the bow 402 to shift from a first state to a second state (i.e., become stiffer or more flexible).

In some embodiments, the variable stiffness system may simply be activated by the push of a button, such that a user of the bow 402 may provide an input closing a switch, or defining a stiffness parameter, and in response, the variable stiffness system may impart a corresponding phase change to at least a portion of a plurality of components embedded within the item of sporting equipment (i.e., bow 402).

Figure 5:
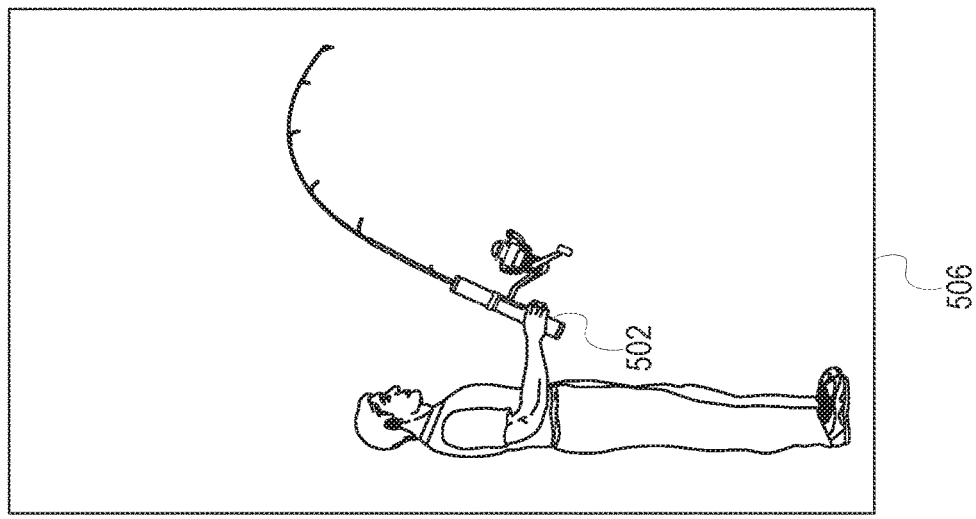
FIG. 5 is a diagram depicting an item of sporting equipment that includes a variable stiffness system, according to certain example embodiments.
Figure 5:
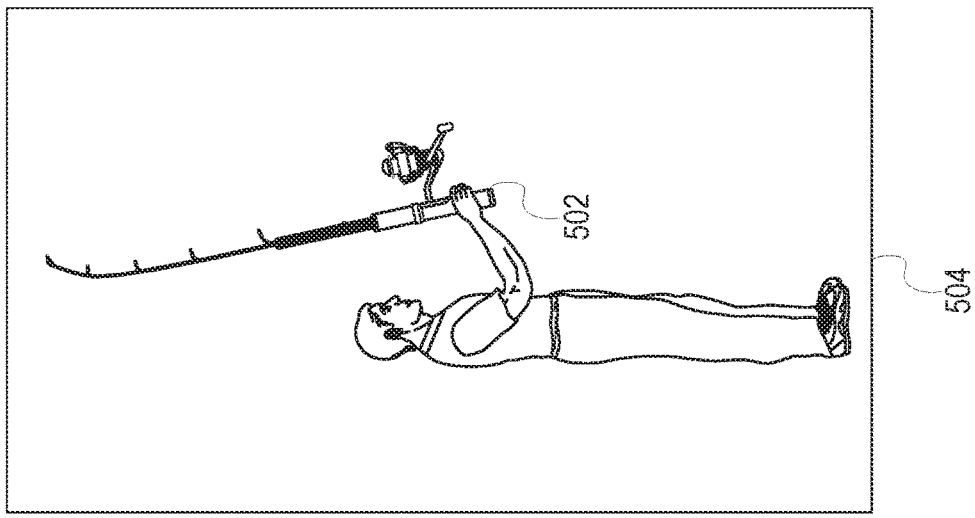

FIG. 5 is a diagram 500 depicting an item of sporting equipment that includes a variable stiffness system, according to certain example embodiments. As seen in FIG. 5, the item of sporting equipment may include a fishing-rod 502.

As discussed above with respect to the bow 402 of the diagram 400, a variable stiffness system may impart a phase change upon at least a portion of thermally responsive components embedded within or upon the item of sporting equipment. For example, in the context of the fishing-rod 502, based on an input received, wherein the input may be based on a measured value of how much the fishing-rod 502 is flexed, or simply based on a press of a button. As seen in the diagram 500, the variable stiffness system may detect the fishing-rod going from an initial state 504 to a flexed state 506, and in response cause a portion of a plurality of thermally responsive components of the fishing-rod 502 to change state, thereby changing corresponding stiffness properties.

In further embodiments, a user of the item of sporting equipment may control or define property threshold or limits through a graphical user interface (GUI) displayed at a client device. For example, the user may define various phase change states based on positions of a multi-position switch. Through the GUI, the user may provide a definition of a phase change to be applied to a portion of a plurality of thermally responsive components embedded within an item of sporting equipment in responsive to trigger criteria that include a position of a multi-position switch, as well as a temporal criteria. As an illustrative example, the user may indicate that when she draws a bow from resting to fully drawn, the variable stiffness system imparts the phase change after 5 seconds of the bow being fully drawn, or that the variable stiffness system only makes the bow 25% stiffer after 5 seconds, and 50% stiffer after 10 seconds.

Figure 6:
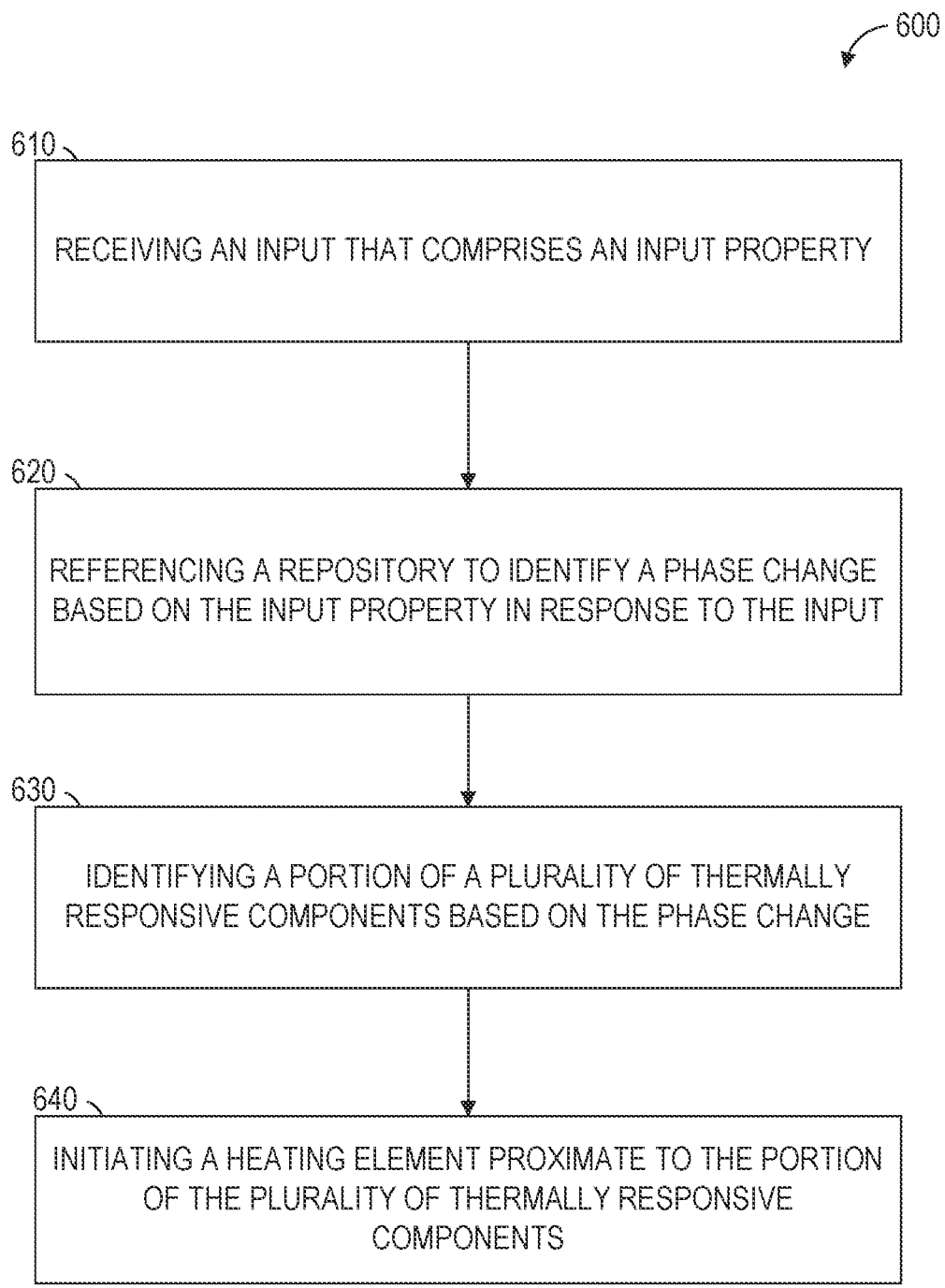
FIG. 6 is a flowchart illustrating a method for varying a stiffness parameter of an item of sporting equipment, according to certain example embodiments.

FIG. 6 is a flowchart 600 of a method for inducing a phase change upon a thermally responsive material, according to certain example embodiments. Operations of the method 600 may be performed by the digitally controlled variable stiffness system and control unit depicted in FIGS. 1-3. As shown in FIG. 6, the method 600 includes operations 610, 620, 630, and 640.

At operation 610, the digitally controlled variable stiffness system receives an input that comprises an input property. The input property may be based on a temporal condition, such as an input duration, an input pressure, as well as an input value, wherein the input value may be based on a position of a multi-position switch.

At operation 620, responsive to receiving the input, the input module of the digitally controllable stiffness system references a repository to identify a phase change based on the input property, wherein the phase change may define a stiffness or flexibility value, a temperature value that corresponds with the stiffness or flexibility value, as well as a portion of the plurality of thermally responsive components upon which to induce the phase change.

At operation 630, the input module identifies a portion of the plurality of thermally responsive components based on the phase change, and at operation 640, causes a heating element proximate to the portion of the plurality of components to impart the phase change based on the corresponding temperature value.

What is claimed is:

1. A system comprising:
    an item body that comprises a first end and a second end;
    a component formed of a thermally responsive material that transitions between a first state and a second state, the first state corresponding with a first physical property and the second state corresponding with a second physical property;
    a heating element proximate to the component formed of the thermally responsive material; and
    an input module comprising one or more processors and a switch mechanism that includes a push-button that comprises an open state and a closed state to receive a user input that initiates the heating element and causes the heating element to apply a temperature change to the thermally responsive material based on a property of the user input, the property including a duration of the input, wherein the duration of the input indicates a period of time in which the push-button is detected in the closed state, and wherein the input causes the component to transition between at least the first state and the second state.

2. The system of claim 1, wherein the thermally responsive material includes nitinol.

3. The system of claim 1, wherein the thermally responsive material is treated by one or more treatment processes that comprises:
    applying a treatment temperature above 550° C. to the thermally responsive material for a time period of at least 5 minutes; and
    quenching the thermally responsive material.

4. The system of claim 3, wherein the treatment temperature includes 805° C.

5. The system of claim 3, wherein the component formed of a thermally responsive material comprises a plurality of components formed of the thermally responsive material, and wherein each component among the plurality of components is treated by the one or more treatment processes.

6. A method for adjusting a property of an item of sporting equipment comprising:
receiving an input at an input component associated with the item of sporting equipment, the input comprising an input property, the input component comprising a switch mechanism that includes a push-button that comprises an open state and a closed state; and
causing a heating element to impart a phase change to a component formed of a thermally responsive material based on the input property of the input, the input property including a duration of the input, wherein the duration of the input comprises a period of time in which the push-button is detected in the closed state.

7. The method of claim 6, wherein causing the heating element to impart the phase change to the component formed of the thermally responsive material further comprises:
causing one or more processors to reference a repository to identify the phase change based on the input property in response to the input.

8. The method of claim 6, wherein the thermally responsive material includes nitinol.

9. The method of claim 6, wherein the thermally responsive material is treated by one or more treatment processes that comprises:
applying a treatment temperature above 550° C. to the thermally responsive material for a time period of at least 5 minutes; and
quenching the thermally responsive material.

10. The method of claim 9, wherein the treatment temperature comprises 805° C.

11. The method of claim 9, wherein the component formed of a thermally responsive material comprises a plurality of components formed of the thermally responsive material, and wherein each component among the plurality of components is treated by the one or more treatment processes.

12. An apparatus comprising:
an item body that comprises a first end and a second end;
a component formed of a thermally responsive material that transitions between a first state and a second state, the first state corresponding with a first physical property and the second state corresponding with a second physical property;
a heating element proximate to the component formed of the thermally responsive material; and
an input module comprising one or more processors and a switch mechanism that includes a push-button that comprises an open state and a closed state to receive a user input that initiates the heating element and causes the heating element to apply a temperature change to the thermally responsive material based on a property of the user input, the property including a duration of the input, wherein the duration of the input indicates a period of time in which the push-button is detected in the closed state, and wherein the input causes the component to transition between at least the first state and the second state.

13. The apparatus of claim 12, wherein the thermally responsive material includes nitinol.

14. The apparatus of claim 12, wherein the thermally responsive material is treated by one or more treatment processes that comprises:
applying a treatment temperature above 550° C. to the thermally responsive material for a time period of at least 5 minutes; and
quenching the thermally responsive material.

15. The apparatus of claim 12, wherein the treatment temperature includes 805° C.

16. The apparatus of claim 12, wherein the input module comprises one or more processors to perform operations that cause the heating element to impart the phase change to the component formed of the thermally responsive material, the operations comprising:
causing one or more processors to reference a repository to identify the phase change based on the input property in response to the input.

* * * * *